United States Patent
Sun et al.

(10) Patent No.: US 9,577,528 B2
(45) Date of Patent: Feb. 21, 2017

(54) POWER CONVERTER

(71) Applicant: DELTA ELECTRONICS, INC., Taoyuan (TW)

(72) Inventors: Li-Ping Sun, Taoyuan (TW); De-Sheng Guo, Taoyuan (TW); Chao Yan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 92 days.

(21) Appl. No.: 14/792,628

(22) Filed: Jul. 7, 2015

(65) Prior Publication Data

US 2016/0065069 A1   Mar. 3, 2016

(30) Foreign Application Priority Data

Sep. 1, 2014   (CN) .......................... 2014 1 0440444

(51) Int. Cl.
*H02M 3/158* (2006.01)
*H02M 7/487* (2007.01)
*H02M 1/00* (2006.01)
*H02M 1/34* (2007.01)

(52) U.S. Cl.
CPC ............. *H02M 3/158* (2013.01); *H02M 7/487* (2013.01); *H02M 2001/0009* (2013.01); *H02M 2001/346* (2013.01)

(58) Field of Classification Search
CPC ..... H02M 3/156; H02M 3/158; H02M 3/1588
USPC ................. 323/222, 223, 224, 225, 271, 282
See application file for complete search history.

(56) References Cited

U.S. PATENT DOCUMENTS

| | | | | |
|---|---|---|---|---|
| 5,982,160 A | * | 11/1999 | Walters | H02M 3/156 323/222 |
| 6,424,129 B1 | * | 7/2002 | Lethellier | H02M 3/1584 323/272 |
| 7,791,380 B2 | | 9/2010 | Bramante et al. | |
| 2003/0038614 A1 | * | 2/2003 | Walters | H02M 3/156 323/282 |
| 2005/0212498 A1 | * | 9/2005 | Kubota | H02M 3/156 323/282 |

(Continued)

FOREIGN PATENT DOCUMENTS

| | | |
|---|---|---|
| CN | 203101479 U | 7/2013 |
| TW | I433592 B | 4/2014 |

*Primary Examiner* — Jeffrey Sterrett
(74) *Attorney, Agent, or Firm* — CKC & Partners Co., Ltd.

(57) ABSTRACT

A power converting circuit includes a converter. The converter receives and converts an input power to provide power for a load. The converter includes a power storage unit, a switch unit, a capacitor unit, and a current sampling unit. The power storage unit includes input and output terminals. The switch unit includes first and second switches, which are series connected at a common terminal, and the common terminal is coupled to the output terminal of the power storage unit. The capacitor unit includes first and second capacitors. The first capacitor and the switch unit are parallel connected to form a capacitor-switch parallel structure. The second capacitor capacitance is more than ten times larger than the first capacitor capacitance. The current sampling unit and the capacitor-switch parallel structure are series connected to form a capacitor-sampling unit series structure. The capacitor-sampling unit series structure and the second capacitor are parallel connected.

17 Claims, 14 Drawing Sheets

(56) References Cited

U.S. PATENT DOCUMENTS

| | | | |
|---|---|---|---|
| 2008/0031020 A1* | 2/2008 | Lee | H02M 3/156 363/40 |
| 2009/0134857 A1* | 5/2009 | Zeng | H02M 3/156 323/282 |
| 2009/0146643 A1* | 6/2009 | Ostrom | H02M 3/156 324/123 R |
| 2014/0002038 A1* | 1/2014 | Hsu | H02M 3/1584 323/271 |
| 2015/0188344 A1* | 7/2015 | Wang | H02J 7/0065 320/107 |
| 2015/0364995 A1* | 12/2015 | Chen | H02M 3/158 323/271 |
| 2016/0065069 A1* | 3/2016 | Sun | H02M 3/158 323/271 |
| 2016/0197545 A1* | 7/2016 | Nemoto | G01R 19/0092 363/78 |
| 2016/0322916 A1* | 11/2016 | Hao | H02M 7/537 |

* cited by examiner

US 9,577,528 B2

POWER CONVERTER

RELATED APPLICATIONS

This application claims priority to Chinese Application Serial Number 201410440444.7, filed Sep. 1, 2014, which is herein incorporated by reference.

BACKGROUND

Field of Invention

The present disclosure relates to power converting technology. More particularly, the present disclosure relates to a power converter.

Description of Related Art

Typically, a current sampling circuit in a switch power supply is directly connected in series to a switch (for example, a metal-oxide-semiconductor field-effect transistor, or MOSFET). However, the current sampling circuit increases the lead inductance of the MOSFET, such that the MOSFET generates a high voltage peak during the switching process. Such a high voltage peak not only generates high frequency noise, but also decreases the efficiency of the switch power supply. Furthermore, if voltage is extremely high, the high voltage may further damage the MOSFET permanently.

Typical ways in which to solve the above-mentioned problems include (1) increasing a gate driving resistance of the MOSFET or connecting a high frequency capacitor at two terminals of the MOSFET in parallel in order to decrease a switching speed of the MOSFET; and (2) using a snubber circuit to absorb a portion of the power of the voltage peak. However, although the peak value of the voltage peak may be reduced using these two methods, the decrease in the switching speed increases the switching loss of the switch power supply, such that the efficiency of the power converter decreases.

In view of the foregoing, problems and disadvantages are associated with existing products that require further improvement. However, those skilled in the art have yet to find a solution.

SUMMARY

The following presents a simplified summary of the disclosure in order to provide a basic understanding to the reader. This summary is not an extensive overview of the disclosure and it does not identify key/critical elements of the present disclosure or delineate the scope of the present disclosure.

One aspect of the present disclosure is directed to a power converter. The power converter includes a converter. The converter is configured to receive and convert an input power for providing power to a load, and the converter includes a power storage unit, a switch unit, and a current sampling unit. The power storage unit includes an input and an output. The switch unit includes a first switch and a second switch. The second switch and the first switch are connected to each other in series at a common terminal, and the common terminal is coupled to the output terminal of the power storage unit. The capacitor unit includes a first capacitor and a second capacitor. The first capacitor and the switch unit are connected to each other in parallel to form a capacitor-switch parallel structure. The capacitance of the second capacitor is more than ten times larger than the capacitance of the first capacitor. The current sampling unit is configured to detect at least one of the current of the first switch and the current of the second switch, and the current sampling unit and the capacitor-switch parallel structure are connected to each other in series to form a capacitor-sampling unit series structure. The capacitor-sampling unit series structure and the second capacitor are connected to each other in parallel.

In view of the foregoing, one embodiment of the present disclosure provide a power converter to improve the problems stemming from a voltage peak which is caused by a current sampling circuit and a switch being connected in series.

These and other features, aspects, and advantages of the present disclosure, as well as the technical means and one embodiment employed by the present disclosure, will become better understood with reference to the following description in connection with the accompanying drawings and appended claims.

BRIEF DESCRIPTION OF THE DRAWINGS

The invention can be more fully understood by reading the following detailed description of the one embodiment, with reference made to the accompanying drawings as follows.

Figure 1A:
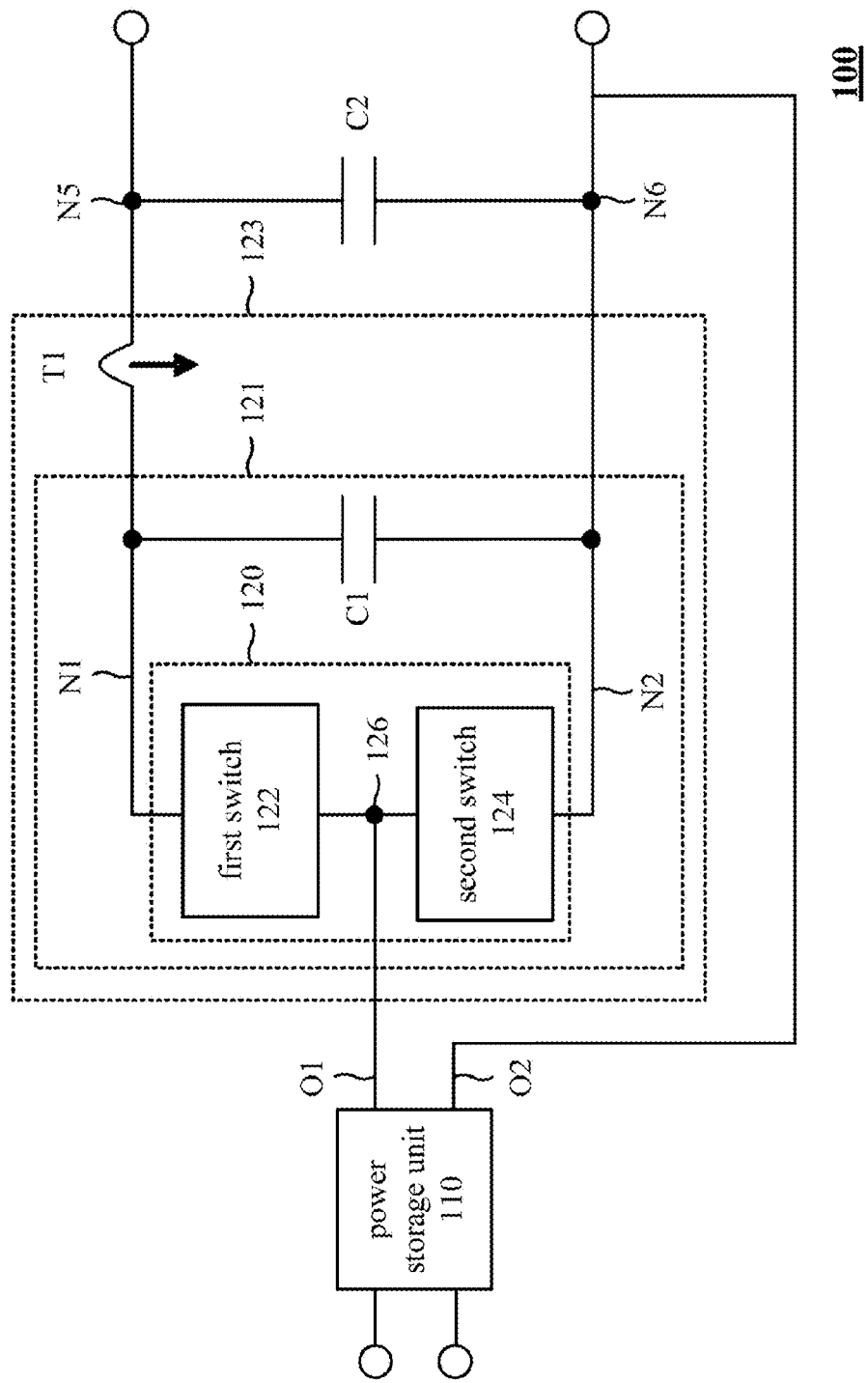
FIG. 1A is a schematic diagram of a power converter according to one embodiment of the present disclosure.

In accordance with common practice, the various described features/elements are not drawn to scale but instead are drawn to best illustrate specific features/elements relevant to the present disclosure. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the examples and the sequence of steps for constructing and operating the examples. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include singular forms of the same.

FIG. 1A is a schematic diagram of a power converter according to one embodiment of the present disclosure. As shown in FIG. 1A, the power converter includes a converter 100. The converter 100 is configured to receive and convert input power for providing power to a load. The converter 100 includes a power storage unit 110, a switch unit 120, a first capacitor unit (for example, the assembly of a first capacitor C1 and a second capacitor C2) and a first current sampling unit (for example, a current sampling element T1). The power storage unit 110 includes an input and an output. The input of the power storage unit 110 can be coupled to power or a load depending on actual requirements. The switch unit 120 includes a first switch 122 and a second switch 124. The second switch 124 and the first switch 122 are connected to each other in series at a first common terminal 126, and the first common terminal 126 is coupled to the output of the power storage unit 110.

The first capacitor unit includes the first capacitor C1 and the second capacitor C2, as described above. The first capacitor C1 and the switch unit 120 are connected to each other in parallel to form a capacitor-switch parallel structure 121. The second capacitor C2 can be coupled to power or a load depending on actual requirements. On the other hand, the first current sampling unit (for example, the current sampling element T1) is configured to detect at least one of the current of the first switch 122 and the current of the second switch 124. In addition, the capacitance of the second capacitor C2 is more than ten times larger than the capacitance of the first capacitor C1. As a result, since the capacitance of the first capacitor C1 is much lower than the capacitance of the second capacitor C2, the first capacitor C1 does not affect the sampling result of the first current sampling unit (for example, the current sampling element T1). Moreover, the first current sampling unit and the capacitor-switch parallel structure 121 are connected to each other in series to form a capacitor-sampling unit series structure 123, and the capacitor-sampling unit series structure 123 is further connected in parallel with the second capacitor C2.

With respect to the converter 100 as shown in FIG. 1A, since the converter 100 includes the first capacitor C1, during the switching process, power mutation of the parasitic inductance of the current sampling element T1 can be restrained by the first capacitor C1 efficiently, such that the voltage peak generated at two terminals of the switch unit 120 can be avoided. However, the present disclosure is not intended to be limited to the embodiment of FIG. 1A, and FIG. 1A illustrates one of one embodiment of the present disclosure. In another embodiment, the first current sampling unit (for example, the current sampling element T1) can be coupled to the node N1 and the node N5, or coupled to the node N2 and the node N6. Therefore, the first current sampling unit (for example, the current sampling element T1) of the present disclosure can be disposed depending on actual requirements to detect the current of the first switch 122 or the current of the second switch 124.

Figure 2:
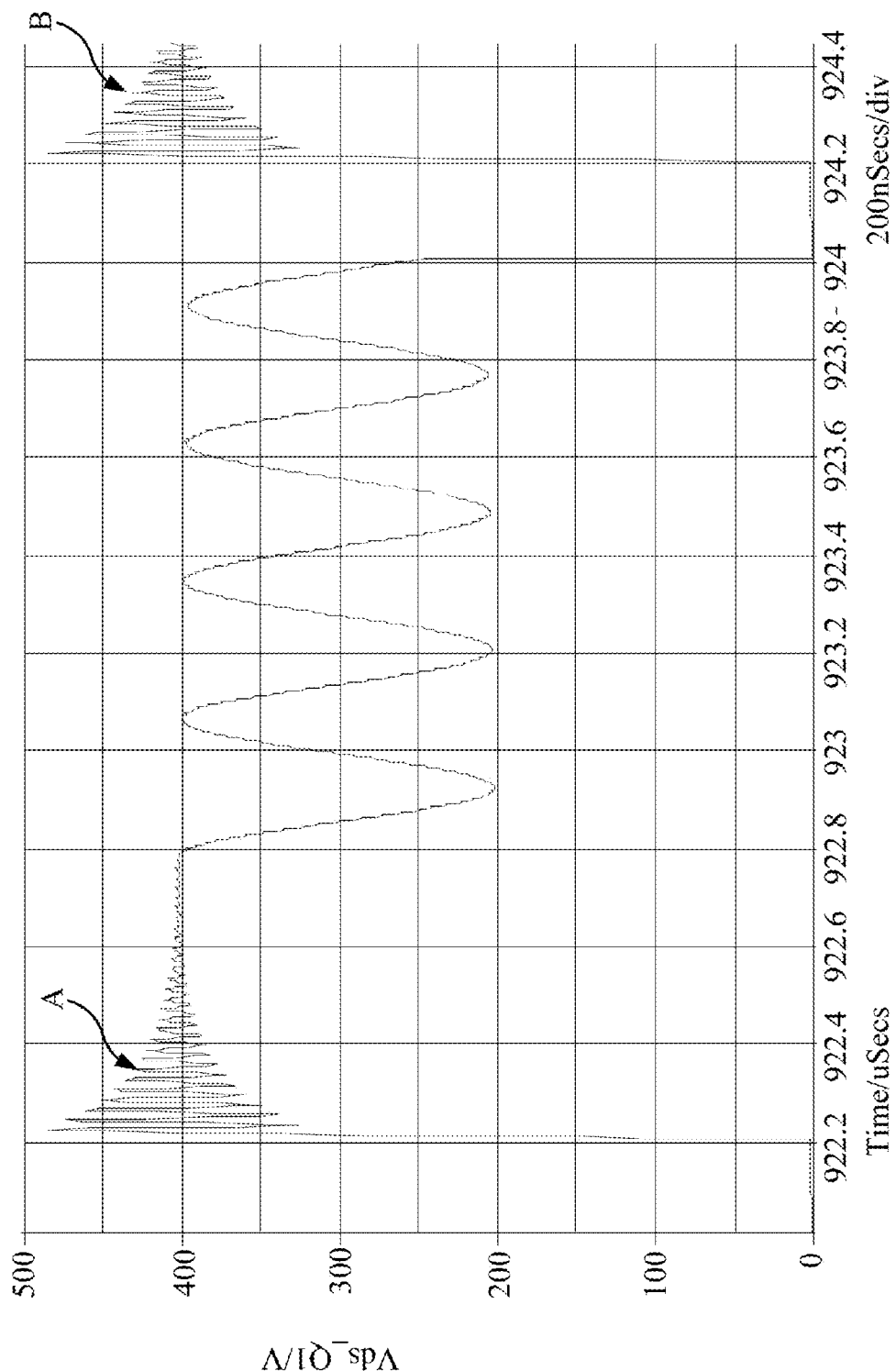
FIG. 2 is a voltage waveform diagram of two terminals of a switch element according to the prior art.
Figure 3:
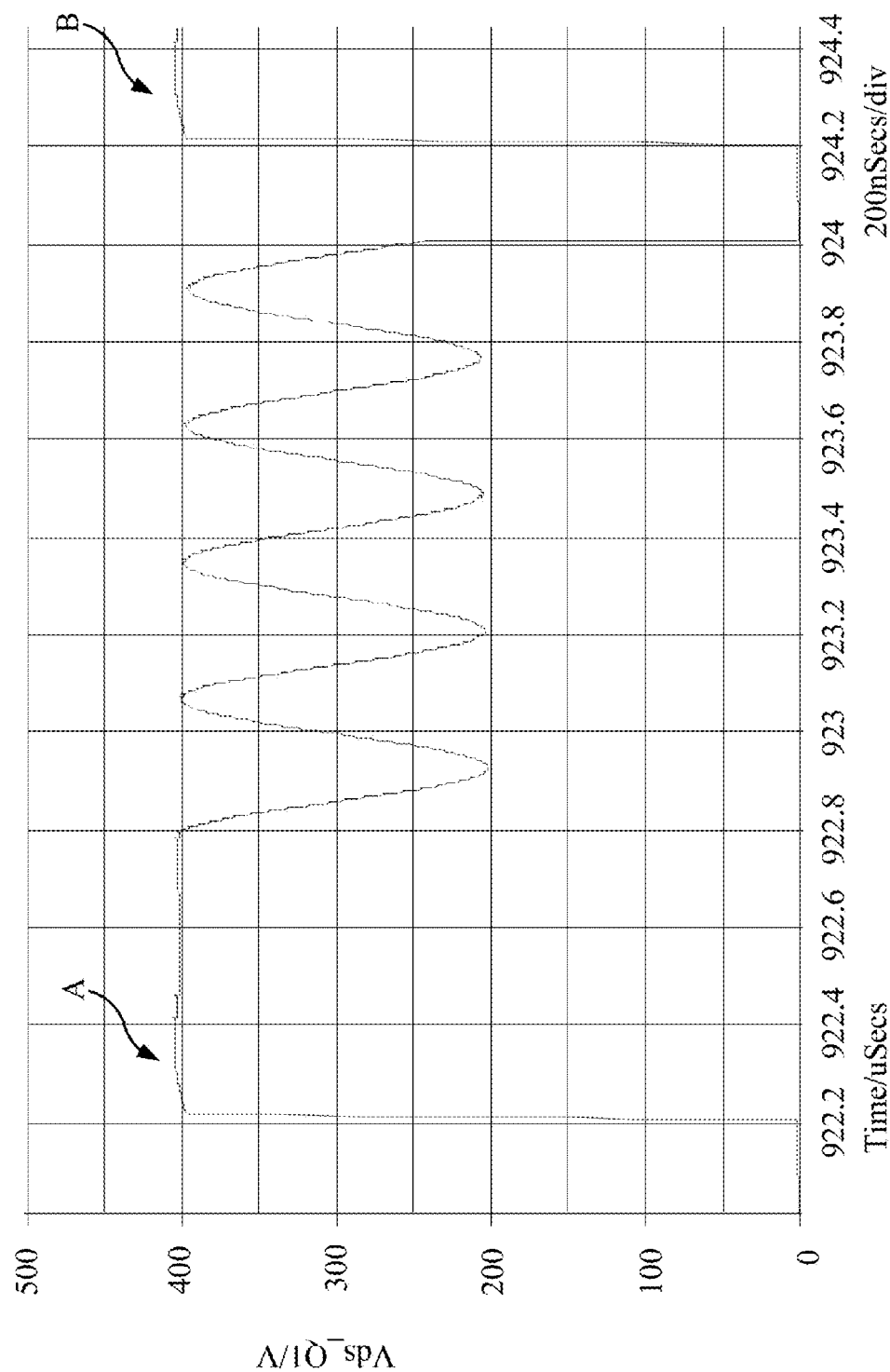
FIG. 3 is a voltage waveform diagram of a power converter according to one embodiment of the present disclosure.

Verification of the effectiveness of the converter 100 of the present disclosure is provided with reference to FIG. 2 and FIG. 3. FIG. 2 is a voltage waveform diagram of two terminals of a switch element according to the prior art, and FIG. 3 is a voltage waveform diagram of a power converter according to one embodiment of the present disclosure. Firstly, referring to FIG. 2, as can be seen in the figure, there is a high voltage peak (see marks A and B) generated at two terminals of a switch element in the prior art. Secondly, referring to FIG. 3, as can be seen, the converter 100 of the present disclosure decreases the voltage peak (see marks A and B) generated at two terminals of a switch element in the prior art. As a result, the converter 100 of the present disclosure can decrease high frequency noise of the prior art, and enhance the efficiency of the converter 100. Moreover, the converter 100 of the present disclosure can decrease the voltage peak generated at two terminals of a switch element in the prior art. Hence, the converter 100 of the present disclosure can avoid permanent damage to switch elements caused by voltage peaks.

Figure 4:
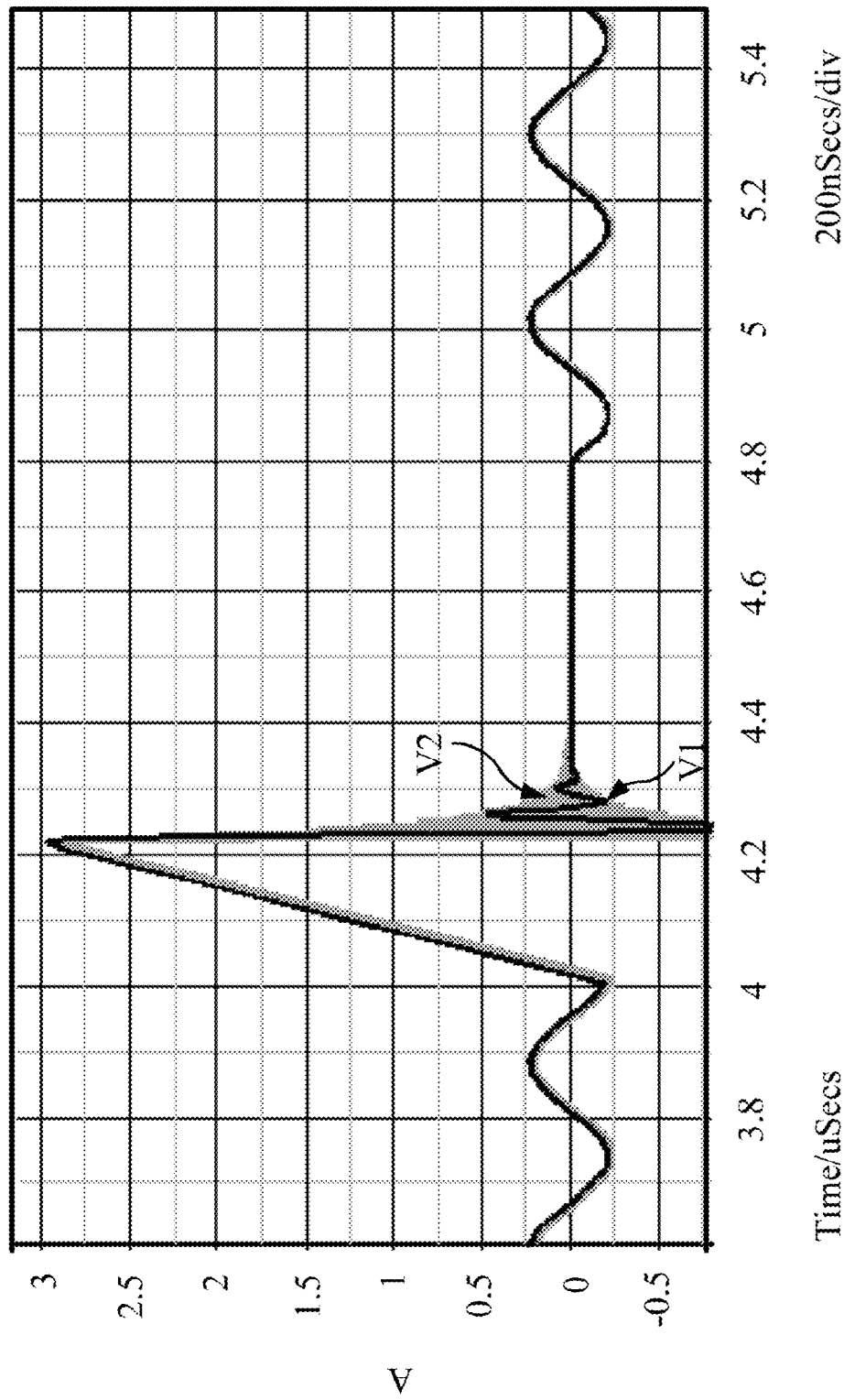
FIG. 4 is a contrast diagram of a current sampling signal and a current of a switch element of a power converter according to one embodiment of the present disclosure.

Even though the converter 100 of the present disclosure reconfigures connections of a current sampling circuit in the prior art, accuracy of sampling of the first current sampling unit in the converter 100 will not be affected, which can be verified by the experiment results shown in FIG. 4. FIG. 4 is a contrast diagram of a current sampling signal V1 and a real current V2 of a switch element of a power converter according to one embodiment of the present disclosure. As shown in FIG. 4, the current sampling signal V1 reproduces the real current V2 of the switch element accurately. Hence, the experiment results shown in FIG. 4 provide verification that the converter 100 can detect the real current of the switch element accurately.

Figure 1B:
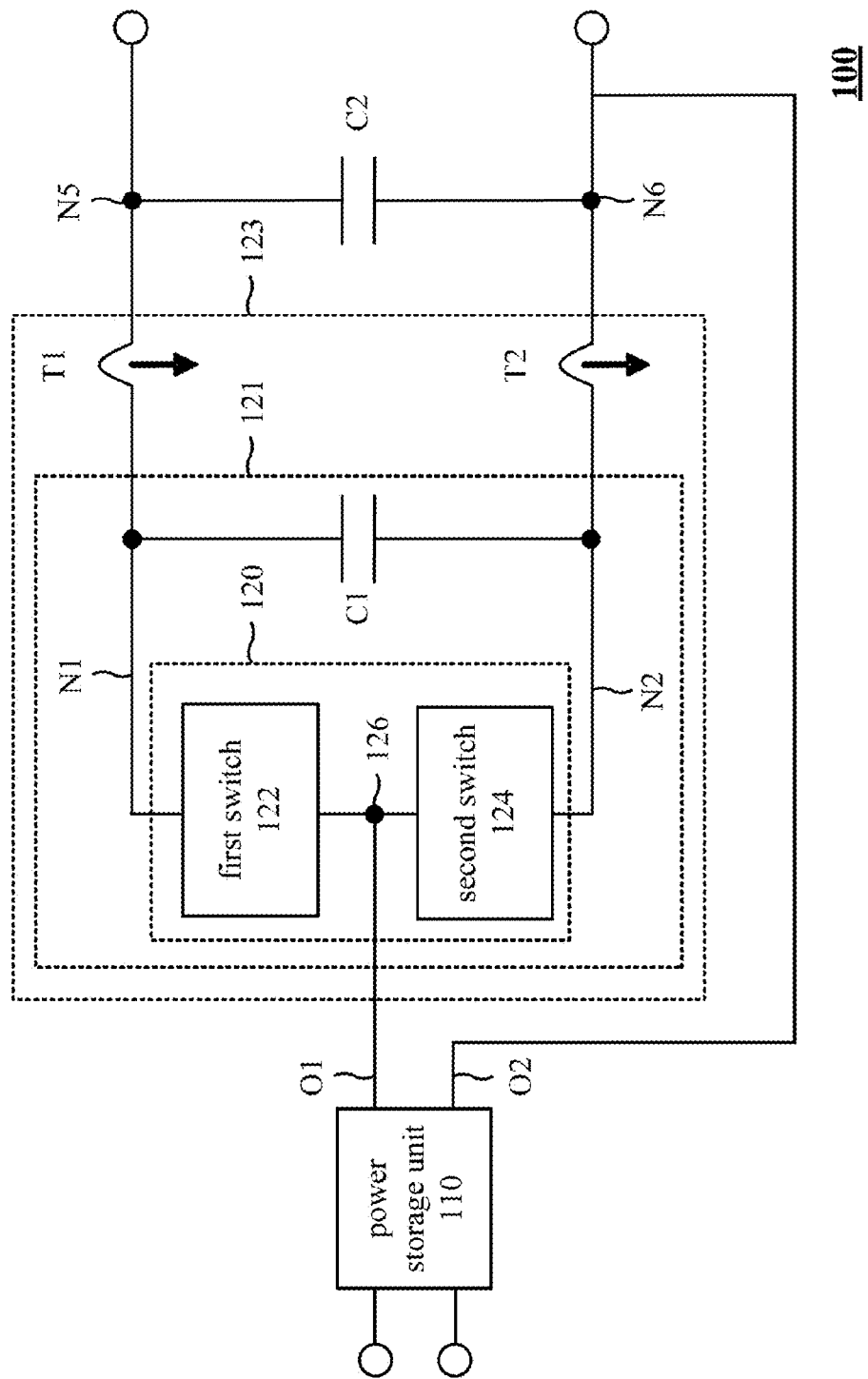
FIG. 1B is a schematic diagram of a power converter according to one embodiment of the present disclosure.

Referring to FIG. 1B, in another embodiment, the capacitor-switch parallel structure 121 includes a first terminal N1 and a second terminal N2. The second capacitor C2 includes a first terminal N5 and a second terminal N6. The first current sampling unit includes a first current sampling element T1 and a second current sampling element T2. With respect to connections, the first current sampling element T1 is coupled between the first terminal N1 of the first capacitor-switch parallel structure 121 and the first terminal N5 of the second capacitor C2, and the second current sampling element T2 is coupled between the second terminal N2 of the first capacitor-switch parallel structure 121 and the second terminal N6 of the second capacitor C2. In yet another embodiment, the output of the power storage unit 110 includes a first connector O1 and a second connector O2. With respect to connections, the first connector O1 is coupled to the first common terminal 126, and the second connector O2 is coupled to the second capacitor C2. Compared with FIG. 1A, the first current sampling element T1 and the second current sampling element T2 of the first current sampling unit can respectively detect the current of the first switch 122 and the current of the second switch 124. For example, the first current sampling element T1 can detect the current of the first switch 122, and the second current sampling element T2 can detect the current of the second switch 124.

Figure 5:
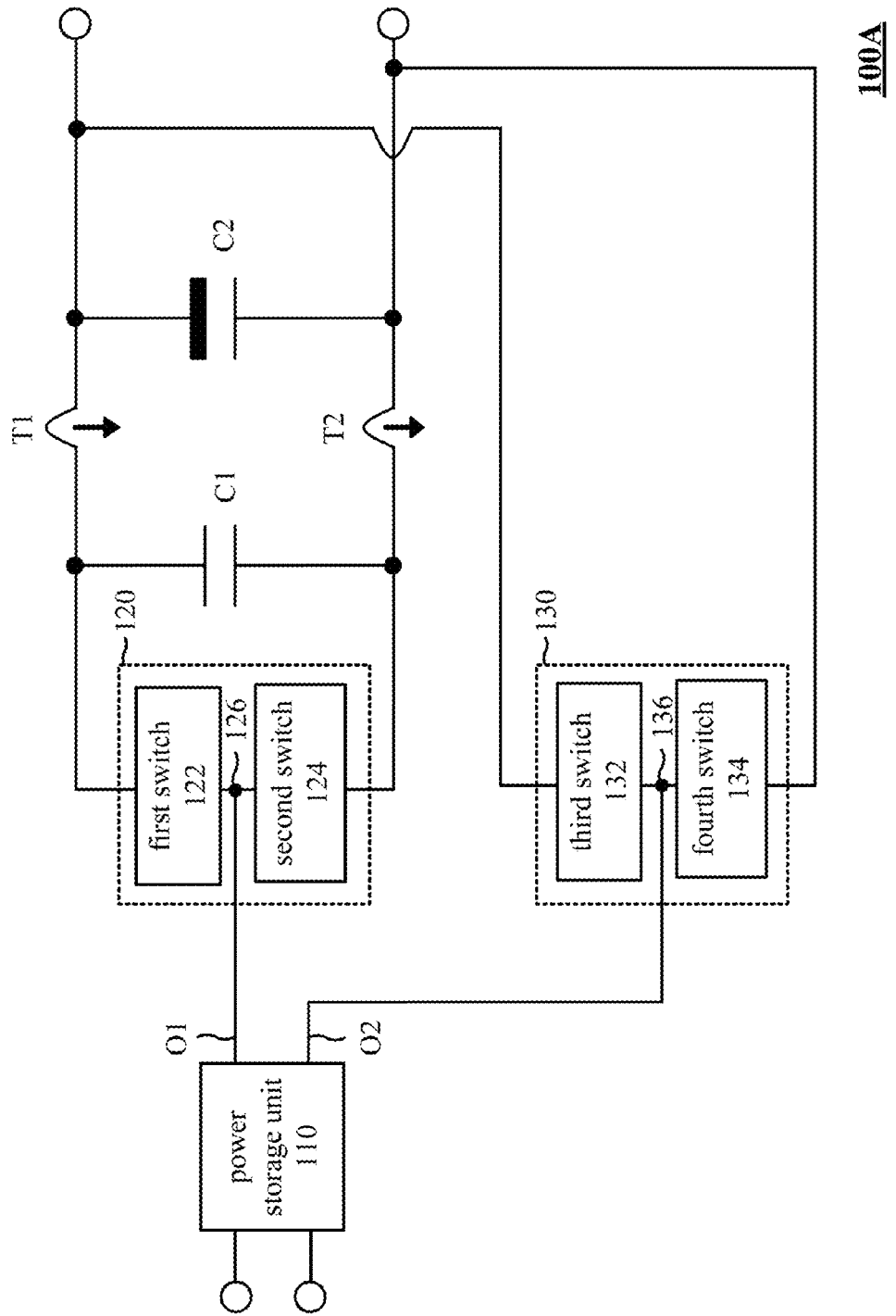
FIG. 5 is a schematic diagram of a power converter according to one embodiment of the present disclosure.

FIG. 5 is a schematic diagram of a converter 100A of a power converter according to one embodiment of the present disclosure. Compared with the converter 100 in FIG. 1B, the converter 100A of FIG. 5 further includes a second switch unit 130. The second switch unit 130 includes a third switch 132 and a fourth switch 134. With respect to connections, the third switch 132 is coupled to the second capacitor C2. The fourth switch 134 and the third switch 132 are connected to each other in series at the second common terminal 136. The fourth switch 134 is coupled to the second capacitor C2. The second common terminal 136 is coupled to the output of the power storage unit 110. In another embodiment, the first connector O1 of the power storage unit 110 is coupled to the first common terminal 126, and the second connector O2 is coupled to the second common terminal 136.

Figure 6:
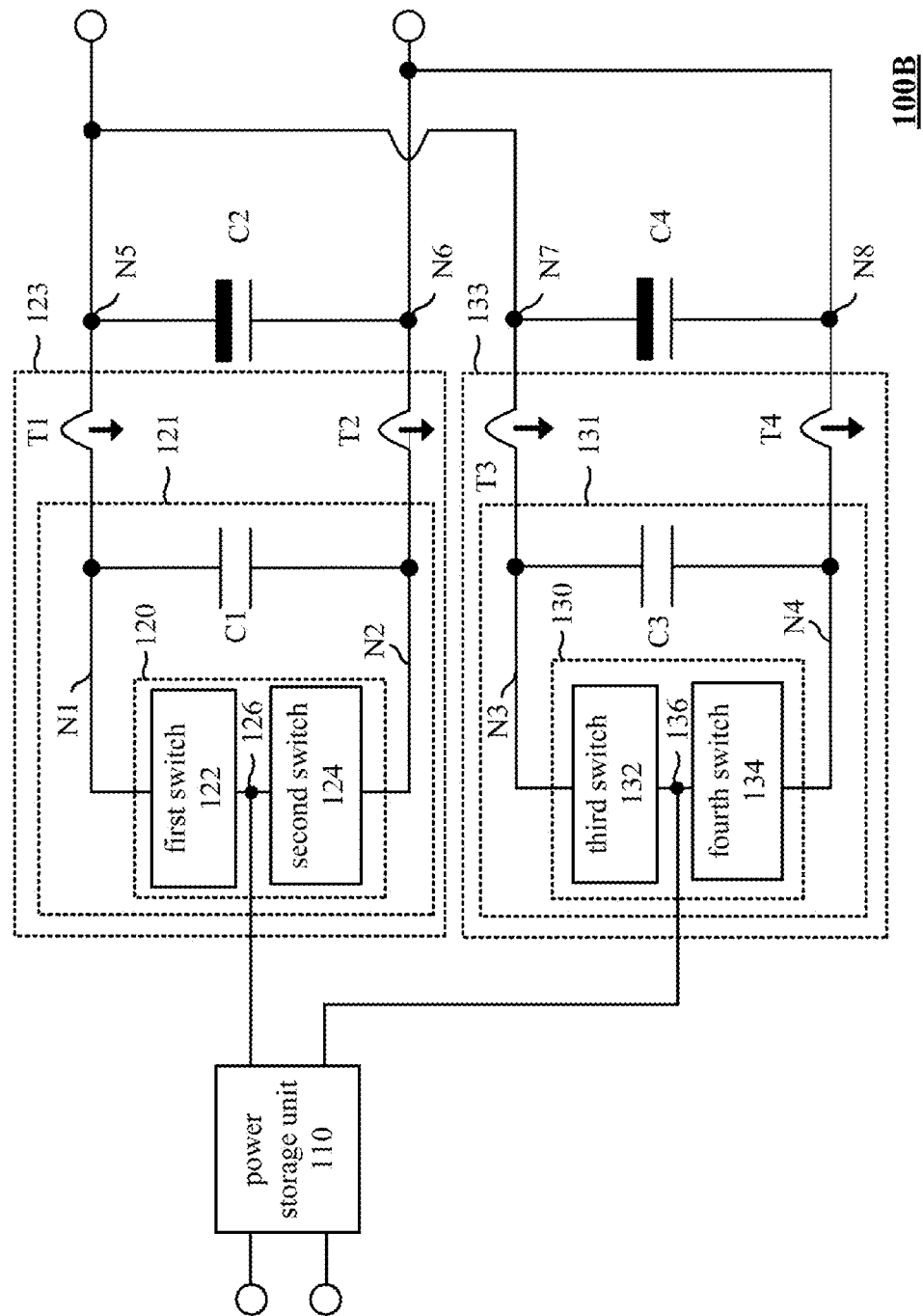
FIG. 6 is a schematic diagram of a power converter according to one embodiment of the present disclosure.

FIG. 6 is a schematic diagram of a converter 100B of a power converter according to one embodiment of the present disclosure. Compared with the converter 100A in FIG. 5, the converter 100B of FIG. 6 further includes a second capacitor unit (for example, the assembly of a third capacitor C3 and a fourth capacitor C4) and the second current sampling unit (for example, the assembly of the current sampling elements T3, T4). The second capacitor unit includes the third capacitor C3 and the fourth capacitor C4, as described above. The third capacitor C3 and the second switch unit 130 are connected to each other in parallel to form a second capacitor-switch parallel structure 131. The capacitance of the fourth capacitor C4 is more than ten times larger than the capacitance of the third capacitor C3. The second current sampling unit and the second capacitor-switch parallel structure 131 are connected to each other in series to form a second capacitor-sampling unit series structure 133. The second capacitor-sampling unit series structure 133 and the fourth capacitor C4 are connected to each other in parallel. The second current sampling unit (for example, an assembly of the current sampling elements T3, T4) is configured to detect at least one of the current of the third switch 132 and the current of the fourth switch 134.

Referring to FIG. 6, in another embodiment, the second capacitor-switch parallel structure 131 includes a first terminal N3 and a second terminal N4, and the fourth capacitor C4 includes a first terminal N7 and a second terminal N8. The second current sampling unit includes a third current sampling unit T3 and a fourth current sampling unit T4. With respect to connections, the third current sampling unit T3 is coupled between the first terminal N3 of the second capacitor-switch parallel structure 131 and the first terminal N7 of the fourth capacitor C4. The fourth current sampling unit T4 is coupled between the second terminal N4 of the second capacitor-switch parallel structure 131 and the second terminal N8 of the fourth capacitor C2.

Figure 7:
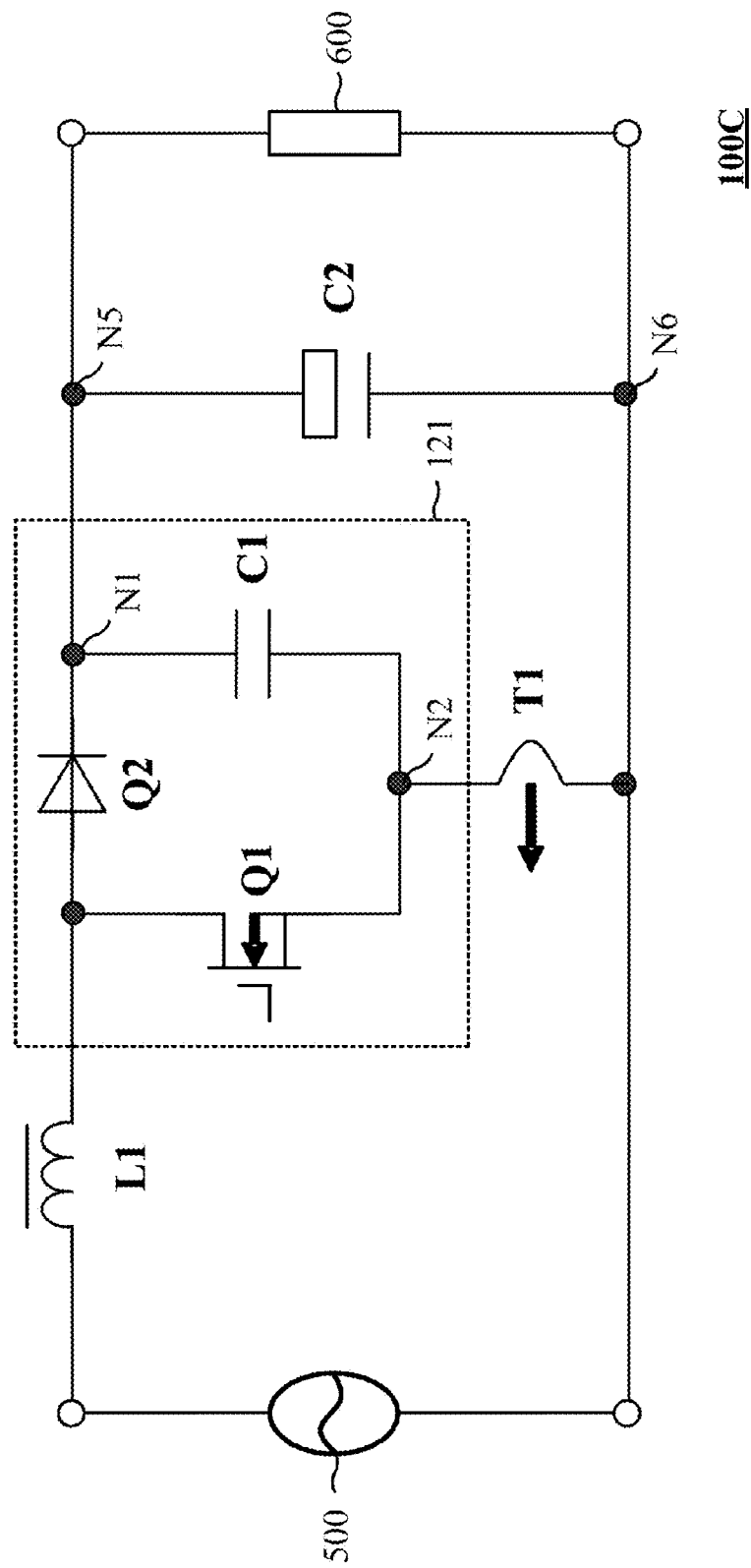
FIG. 7 is a schematic diagram of a power converter according to one embodiment of the present disclosure.

When implementing the invention, each of the first switch 122, the second switch 124, the third switch 132, and the fourth switch 134 includes at least one of a diode, a metal-oxide-semiconductor field-effect transistor (MOSFET) and an insulated gate bipolar transistor (IGBT). However, the present disclosure is not intended to be limited to such an embodiment. The skilled person can adaptively choose an appropriate element to implement the first to fourth switches 122, 124, 132, 134. In addition, when implementing the invention, each of the first capacitor C1 and the third capacitor C3 includes at least one of a film capacitor and a ceramic capacitor, and each of the second capacitor C2 and the fourth capacitor C4 includes an electrolytic capacitor. However, the present disclosure is not intended to be limited to such an embodiment. The skilled person can adaptively choose an appropriate element to implement the first to fourth capacitors C1~C4. Moreover, when implementing the invention, each of the first to fourth current sampling units T1~T4 includes at least one of a current transformer and a sampling resistor. However, the present disclosure is not intended to be limited to such an embodiment. The skilled person can adaptively choose an appropriate element to implement the first to fourth current sampling units T1~T4. FIG. 7 is a schematic diagram of a power converter according to one embodiment of the present disclosure. The converter 100C in FIG. 7 is a specific circuit diagram of the converter 100 in FIG. 1A. In the embodiment of FIG. 7, the power storage unit 110 can be realized by an inductor L1. The first switch 122 can be realized by the diode Q2. The second switch 124 can be realized by the transistor Q1. In addition, the inductor L1 is configured to be coupled to power 500, and the power 500 can provide power to the input of the converter 100C. Moreover, the second capacitor C2 is configured to be coupled to the load 600. Furthermore, the first current sampling unit includes a current sampling element T1. The current sampling element T1 is coupled between the second terminal N2 of the first capacitor-switch parallel structure 121 and the second terminal N6 of the second capacitor C2.

With respect to operations, the current sampling element T1 detects the sum of the current of the transistor Q1 and the current of the first capacitor C1. If the transistor Q1 is turned on and the diode Q2 is turned off, the current of the first capacitor C1 is 0. Hence, the current detected by the current sampling element T1 is equal to the current of the transistor Q1. If the transistor Q1 is turned off and the diode Q2 is turned on, the current of the first capacitor C1 and the second capacitor C2 is inversely proportional to the capacitance of the first capacitor C1 and the second capacitor C2. Since the capacitance of the first capacitor C1 is much lower than the capacitance of the second capacitor C2 (C1<C2*10%), the sampling signal is not affected. Simultaneously, owing to the property of the first capacitor C1 for filtering high frequency current, the high frequency current of the transistor Q1 will be isolated, such that the sampling signal of the current sampling element T1 is made more smooth and accurate. However, the present disclosure is not intended to be limited to such an embodiment, and such an embodiment illustrates one of one embodiment of the present disclosure to facilitate the understating of the present disclosure.

Figure 8:
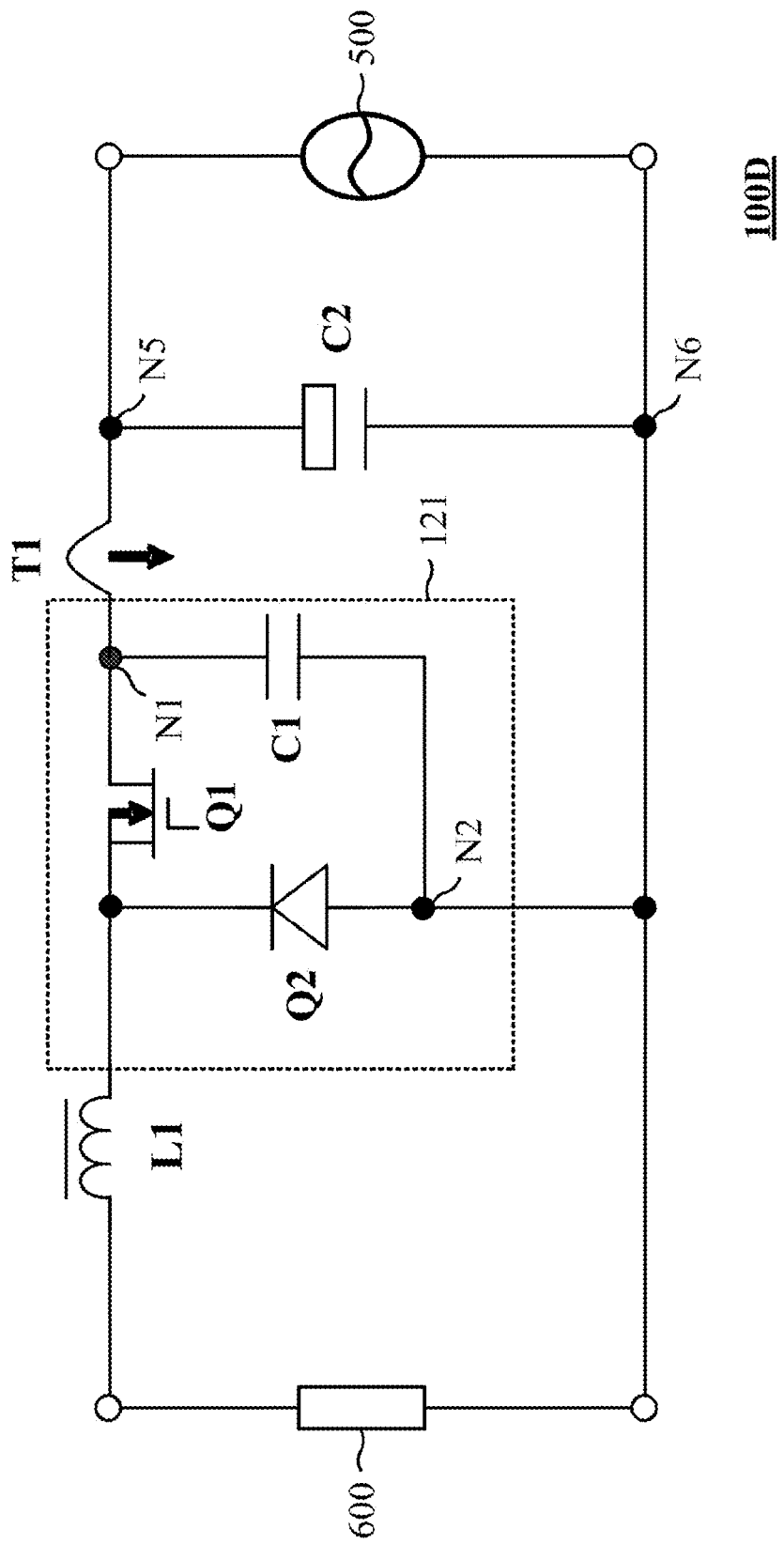
FIG. 8 is a schematic diagram of a buck converter according to one embodiment of the present disclosure.

FIG. 8 is a schematic diagram of a buck converter 100D according to one embodiment of the present disclosure. The converter 100D in FIG. 8 is a specific circuit diagram of the converter 100 in FIG. 1A. In the embodiment of FIG. 8, the power storage unit 110 can be realized by the inductor L1. The first switch 122 can be realized by the transistor Q1. The second switch 124 can be realized by the diode Q2. In addition, the inductor L1 is configured to be coupled to the load 600. Furthermore, the second capacitor C2 is configured to be coupled to power 500, and the power 500 can provide power to the input of the converter 100D. Moreover, the current sampling unit includes a current sampling element T1. The current sampling element T1 is coupled between the first terminal N1 of the first capacitor-switch parallel structure 121 and the first terminal N5 of the second capacitor C2. However, the present disclosure is not intended to be limited to such an embodiment, and such an embodiment illustrates one of one embodiment of the present disclosure to facilitate the understating of the present disclosure.

Figure 9:
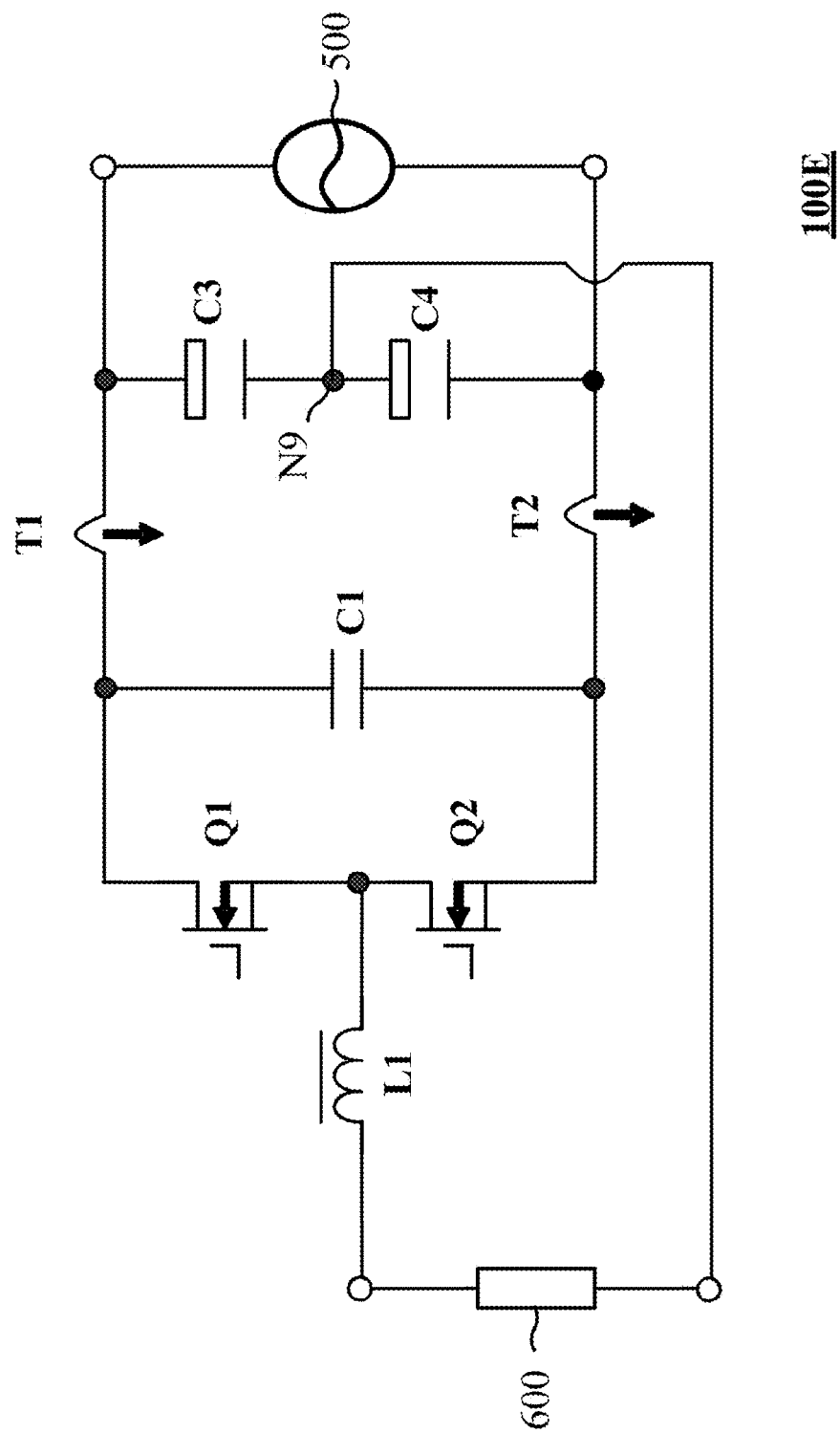
FIG. 9 is a schematic diagram of a half-bridge converter according to one embodiment of the present disclosure.

The converter 100 as shown in FIG. 1B can be implemented in many kinds of converters for achieving the goal of avoiding the high voltage peak generated at two terminals of a switch element. FIG. 9 is a schematic diagram of a half-bridge converter 100E according to one embodiment of the present disclosure. In the embodiment of FIG. 9, the power storage unit 110 can be realized by the inductor L1. The first switch 122 can be realized by the transistor Q1. The second switch 124 can be realized by the transistor Q2. In addition, the inductor L1 is configured to be coupled to the load 600. Furthermore, the second capacitor C2 in the converter 100D of FIG. 8 can be replaced by the capacitor C3 and the capacitor C4 according to the structure of the half-bridge converter 100E adaptively. Moreover, the capacitor C3 and the capacitor C4 can be connected to each other in series at a node N9, and the node N9 is configured to be coupled to the load 600. In addition, an assembly of the capacitor C3 and the capacitor C4 is coupled to power 500, and the power 500 can provide power to the half-bridge converter 100E.

In addition, the first current sampling element T1 can be coupled to the capacitor C1 and the capacitor C3, and the second current sampling element T2 can be coupled to the capacitor C1 and the capacitor C4. The first current sampling element T1 can detect the current of the transistor Q1, and the second current sampling element T2 can detect the current of the transistor Q2. However, the present disclosure is not intended to be limited to such an embodiment, and such an embodiment illustrates one of one embodiment of the present disclosure to facilitate the understating of the present disclosure.

Figure 10:
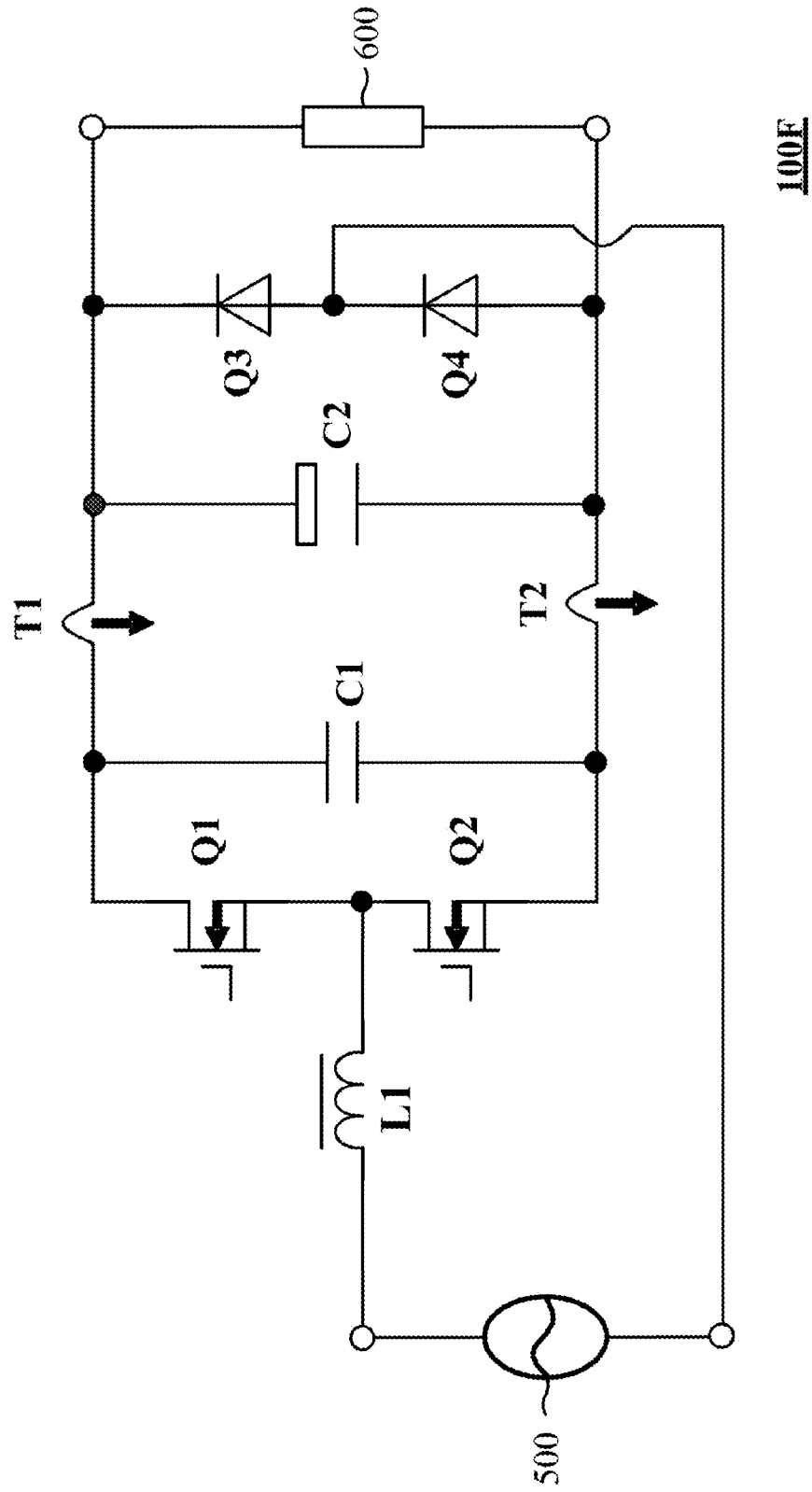
FIG. 10 is a schematic diagram of a totem-pole converter according to one embodiment of the present disclosure.
Figure 11:
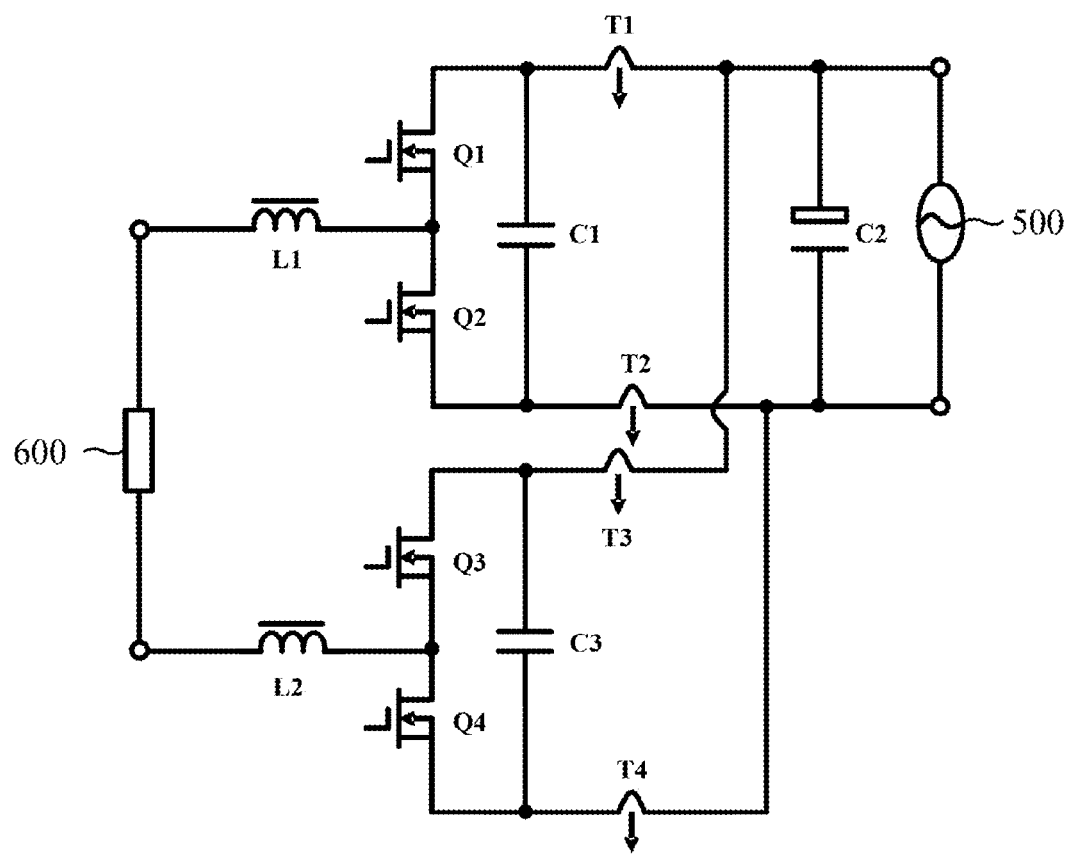
FIG. 11 is a schematic diagram of a full-bridge converter according to one embodiment of the present disclosure.
Figure 12:
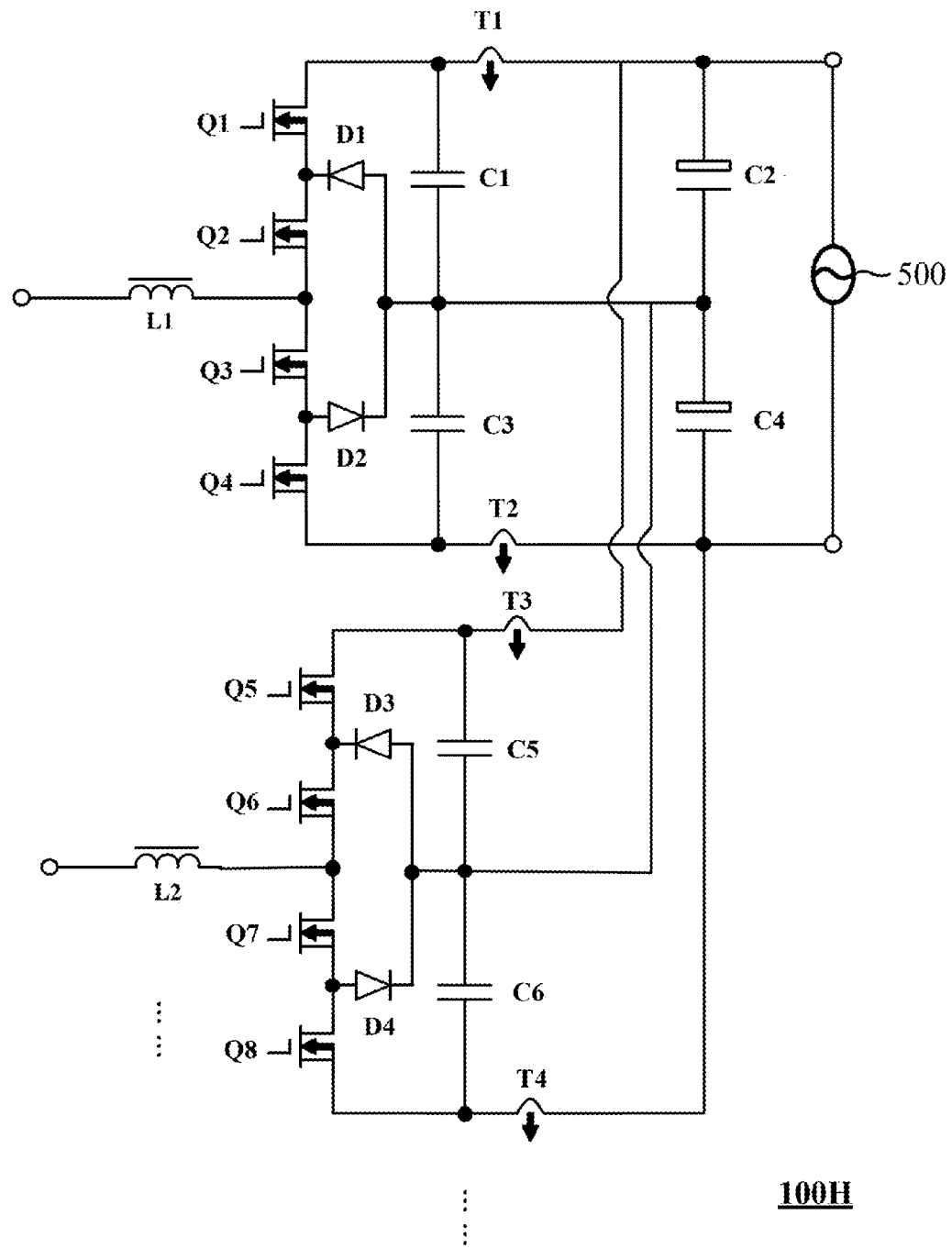
FIG. 12 is a schematic diagram of a T-type three-level converter according to one embodiment of the present disclosure.
Figure 13:
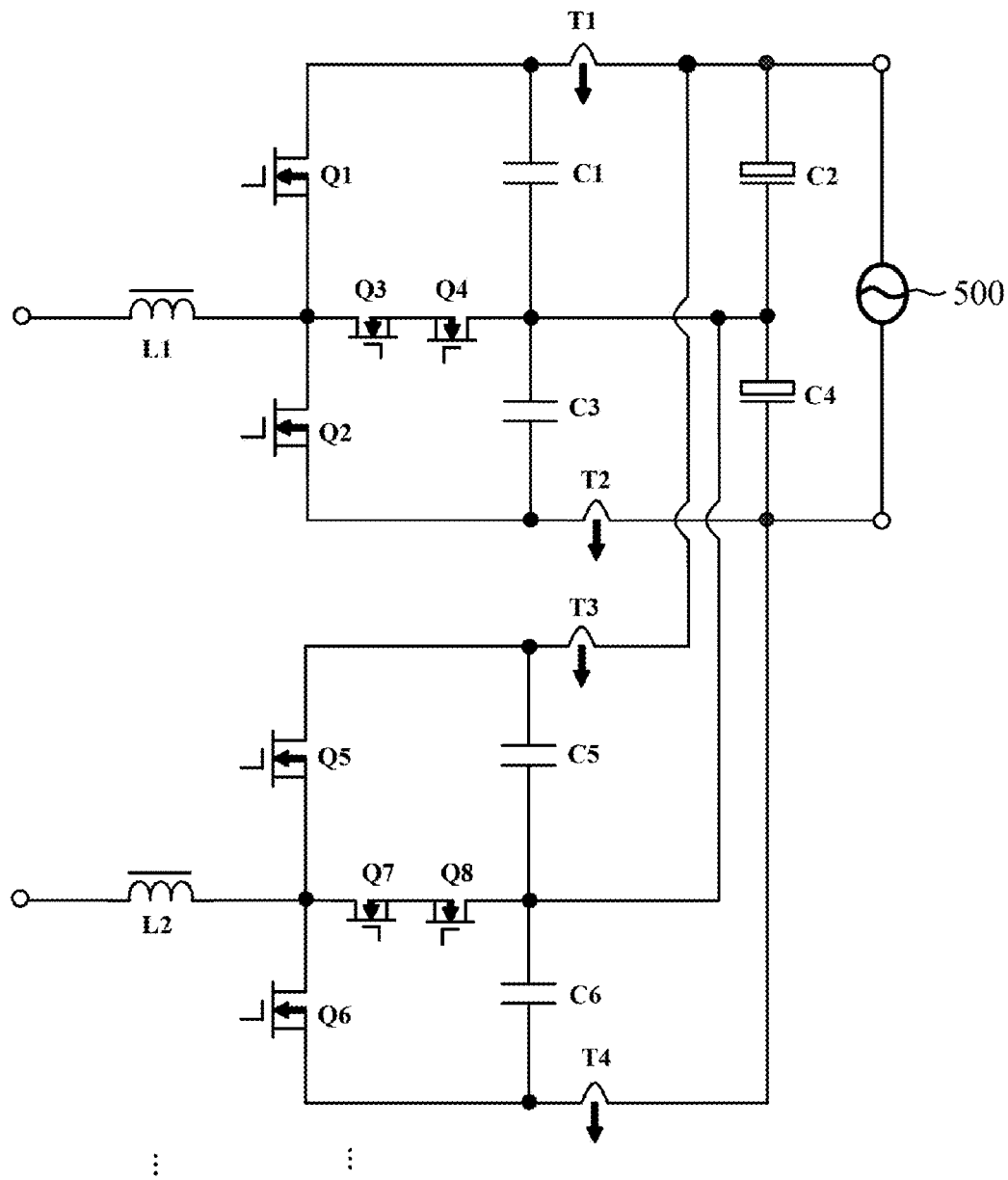
FIG. 13 is a schematic diagram of an I-type three-level converter according to one embodiment of the present disclosure.

The converter 100 of the present disclosure can be implemented in many kinds of converters as follows: a totem-pole converter 100F as shown in FIG. 10, which is a schematic diagram of a totem-pole converter 100F according to one embodiment of the present disclosure; a full-bridge converter 100G as shown in FIG. 11, which is a schematic diagram of a full-bridge converter 100G according to one embodiment of the present disclosure; a T-type three-level converter 100H as shown in FIG. 12, which is a schematic diagram of a T-type three-level converter 100H according to one embodiment of the present disclosure; and an I-type three-level converter 100I as shown in FIG. 13, which is a schematic diagram of an I-type three-level converter 100I according to one embodiment of the present disclosure. However, the present disclosure is not intended to be limited to such one embodiment, and such one embodiment illustrate a few one embodiment of the present disclosure to facilitate the understating of the present disclosure. Without departing the spirit of the present disclosure, the converter 100 of the present disclosure can be applied in other kings of converters so as to achieving the goal of avoiding generating a high voltage peak at two terminals of a switching element.

In view of the above one embodiment of the present disclosure, it is apparent that the application of the present disclosure has a number of advantages. One embodiment of the present disclosure provide a power converter to improve the problems stemming from a voltage peak which is caused by a current sampling circuit and a switch being connected in series.

Although the present disclosure has been described in considerable detail with reference to certain one embodiment thereof, other one embodiment are possible. Therefore, the spirit and scope of the appended claims should not be limited to the description of the one embodiment contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A power converter, comprising a converter, wherein the converter is configured to receive and convert an input power for providing power to a load, and the converter comprises:
   a power storage unit comprising:
      an input; and
      an output;
   a first switch unit comprising:
      a first switch; and
      a second switch connected in series with the first switch at a first common terminal, wherein the first common terminal is coupled to the output of the power storage unit;
   a first capacitor unit comprising:
      a first capacitor connected in parallel with the first switch unit to form a first capacitor-switch parallel structure; and
      a second capacitor, wherein the capacitance of the second capacitor is more than ten times larger than the capacitance of the first capacitor; and
   a first current sampling unit connected in series with the first capacitor-switch parallel structure to form a first capacitor-sampling unit series structure, wherein the first capacitor-sampling unit series structure and the second capacitor are connected in parallel, wherein the first current sampling unit is configured to detect at least one of the current of the first switch and the current of the second switch.

2. The power converter of claim 1, wherein the first capacitor-switch parallel structure comprises a first terminal and a second terminal, wherein the second capacitor comprises a first terminal and a second terminal;
   wherein the first current sampling unit comprises:
      a first current sampling element coupled between the first terminal of the first capacitor-switch parallel structure and the first terminal of the second capacitor; and
      a second current sampling element coupled between the second terminal of the first capacitor-switch parallel structure and the second terminal of the second capacitor.

3. The power converter of claim 1, wherein the output of the power storage unit comprises:
   a first connector coupled to the first common terminal; and
   a second connector coupled to the second capacitor.

4. The power converter of claim 1, wherein the first capacitor is selected from the group consisting of a film capacitor and a ceramic capacitor.

5. The power converter of claim 1, wherein the second capacitor comprises an electrolytic capacitor.

6. The power converter of claim 1, wherein the first current sampling unit is selected from the group consisting of a current transformer and a sampling resistor.

7. The power converter of claim 1, further comprising:
   a second switch unit comprising:
      a third switch coupled to the second capacitor; and
      a fourth switch connected in series with the third switch at a second common terminal, and coupled to the second capacitor, wherein the second common terminal is coupled to the output of the power storage unit.

8. The power converter of claim 7, wherein each of the first switch to the fourth switch is selected from the group consisting of a diode, a metal-oxide-semiconductor field-effect transistor (MOSFET) and an insulated gate bipolar transistor (IGBT).

9. The power converter of claim 7, wherein the output of the power storage unit comprises:
   a first connector coupled to the first common terminal; and
   a second connector coupled to the second common terminal.

10. The power converter of claim 7, further comprising:
   a second capacitor unit comprising:
      a third capacitor connected in parallel with the second switch unit to form a second capacitor-switch parallel structure; and
      a fourth capacitor, wherein the capacitance of the fourth capacitor is at least more than ten times larger than the capacitance of the third capacitor; and
   a second current sampling unit connected in series with the second capacitor-switch parallel structure to form a second capacitor-sampling unit series structure, wherein the second capacitor-sampling unit series structure and the fourth capacitor are connected in parallel, wherein the second current sampling unit is configured to detect at least one of the current of the third switch and the current of the fourth switch.

11. The power converter of claim 10, wherein each of the first capacitor and the third capacitor is selected from the group consisting of a film capacitor and a ceramic capacitor.

12. The power converter of claim 10, wherein each of the second capacitor and the fourth capacitor comprises an electrolytic capacitor.

13. The power converter of claim 10, wherein the second capacitor-switch parallel structure comprises a first terminal and a second terminal, wherein the fourth capacitor comprises a first terminal and a second terminal; wherein the second current sampling unit comprises:
   a third current sampling unit coupled between the first terminal of the second capacitor-switch parallel structure and the first terminal of the fourth capacitor; and
   a fourth current sampling unit coupled between the second terminal of the second capacitor-switch parallel structure and the second terminal of the fourth capacitor.

14. The power converter of claim 13, wherein each of the first current sampling element to the fourth current sampling element is selected from the group consisting of a current transformer and a sampling resistor.

15. The power converter of claim 1, wherein the first current sampling unit comprises a current sampling element, and the current sampling element is coupled between the second terminal of the first capacitor-switch parallel structure and the second terminal of the second capacitor, wherein the input of the power storage unit is configured to receive the input power, and the second capacitor is coupled to the load.

16. The power converter of claim 1, wherein the first current sampling unit comprises a current sampling element, and the current sampling element is coupled between the first terminal of the first capacitor-switch parallel structure and the first terminal of the second capacitor, wherein the input of the power storage unit is coupled to the load, and the second capacitor is configured to receive the input power.

17. The power converter of claim 1, wherein the converter is selected from the group consisting of a half-bridge circuit, a totem-pole circuit, a full-bridge circuit, a T-type three-level converter and a I-type three-level converter.

* * * * *